(12) United States Patent
Percival

(10) Patent No.: US 9,297,427 B2
(45) Date of Patent: Mar. 29, 2016

(54) HYDRAULIC SHAFT COUPLING APPARATUS

(75) Inventor: Jeffrey D. Percival, Pueblo West, CO (US)

(73) Assignee: Taylor Cable Products, Inc., Grandview, MO (US)

( * ) Notice: Subject to any disclaimer, the term of this patent is extended or adjusted under 35 U.S.C. 154(b) by 189 days.

(21) Appl. No.: 13/825,836

(22) PCT Filed: Sep. 23, 2011

(86) PCT No.: PCT/US2011/052968
§ 371 (c)(1),
(2), (4) Date: Oct. 8, 2013

(87) PCT Pub. No.: WO2012/040573
PCT Pub. Date: Mar. 29, 2012

(65) Prior Publication Data
US 2014/0144289 A1    May 29, 2014

Related U.S. Application Data

(60) Provisional application No. 61/386,481, filed on Sep. 23, 2010.

(51) Int. Cl.
| F16D 31/04 | (2006.01) |
| F16D 31/08 | (2006.01) |
| F16D 43/04 | (2006.01) |
| F02C 7/32 | (2006.01) |
| F02C 7/36 | (2006.01) |
| F16H 47/02 | (2006.01) |

(52) U.S. Cl.
CPC . *F16D 31/04* (2013.01); *F02C 7/32* (2013.01); *F02C 7/36* (2013.01); *F16D 31/08* (2013.01); *F16H 47/02* (2013.01); *F05D 2260/406* (2013.01); *F05D 2260/4031* (2013.01); *F16D 43/04* (2013.01); *Y10T 74/19149* (2015.01)

(58) Field of Classification Search
CPC .................................. F16D 31/04; F16D 31/08
USPC .................................................. 192/61; 475/95
See application file for complete search history.

(56) References Cited

U.S. PATENT DOCUMENTS

| 561,520 | A | * | 6/1896 | Richards | 192/61 |
| 873,621 | A | * | 12/1907 | Schwarz | 192/61 |
| 1,368,476 | A | * | 2/1921 | Bovee | 475/105 |
| 2,195,619 | A | * | 4/1940 | Cumbus et al. | 192/61 |

(Continued)

OTHER PUBLICATIONS

Preliminary Report on Patentability issued in co-pending PCT Patent Application PCT/US2011/052968, filed Sep. 23, 2011.

*Primary Examiner* — Richard Lorence
(74) *Attorney, Agent, or Firm* — Joseph M. Rolnicki; Evans & Dixon, L.L.C.

(57) ABSTRACT

A hydraulic shaft coupling apparatus transfers power from a rotating drive shaft to a driven load shaft, where the apparatus has a self-contained internal fluid flow path having a fluid control valve that controls the flow of hydraulic fluid through the flow path to allow fluid flow when there is a substantial difference between drive shaft and driven shaft rotational speeds, and to gradually restrict the fluid flow as the difference between drive shaft and driven shaft speeds decrease to the point where fluid flow through the fluid passage is substantially stopped by the control valve resulting in the one-to-one transfer of rotational power from the drive shaft to the driven shaft.

14 Claims, 10 Drawing Sheets

(56) References Cited

U.S. PATENT DOCUMENTS 2,197,165 A * 4/1940 Webster ................ 475/108
4,248,332 A    2/1981 Noyes
4,445,599 A    5/1984 Bopp

* cited by examiner

HYDRAULIC SHAFT COUPLING APPARATUS

CROSS REFERENCE TO RELATED APPLICATIONS

This patent application claims the benefit of the filing date of provisional patent application Ser. No. 61/386,481, which was filed on Sep. 23, 2010.

BACKGROUND OF THE INVENTION (1) Field of the Invention

The present invention pertains to a hydraulic shaft coupling apparatus that is used to transfer rotating power from a prime mover, such as an internal combustion engine or electric motor, to a rotating driven load such as a gear transmission. More specifically, the present invention pertains to a hydraulic shaft coupling apparatus that transfers power from a rotating drive shaft to a driven load shaft, where the apparatus has a self-contained internal fluid flow path having a fluid control valve that controls the flow of hydraulic fluid through the flow path to allow fluid flow when there is a substantial difference between drive shaft and driven shaft rotational speeds, and to gradually restrict the fluid flow as the difference between drive shaft and driven shaft speeds decreases to the point where fluid flow through the fluid passage is substantially stopped by the control valve resulting in a one-to-one transfer of rotational power from the drive shaft to the driven shaft.

(2) Description of the Related Art.

Internal combustion engines and electric motors of various types have been used to provide power to various different means of transportation such as passenger cars, trucks, locomotives and other various different types of wheeled vehicles, as well as maritime vessels, etc. In transportation means such as passenger cars, the internal combustion engine is typically connected to a gear transmission to power the driving wheels of the passenger car. The transmission enables the car to change speed smoothly and controllably in order to move the car at various levels of speed and to provide the needed power to the wheels of the car for driving up hill or for pulling a load.

The coupling of the internal combustion engine to the gear transmission is conventionally achieved through the use of a mechanical clutch in vehicles with manually controlled gear transmissions, or through the use of a torque converter type of fluid coupling in vehicles having automatic transmissions. The mechanical clutch and the torque converter have their merits and problems.

They hydraulic shaft coupling apparatus of the present invention overcomes some of the those problems, and can be easily adapted to be used in place of a mechanical clutch or torque converter coupling, as well as various other types of couplings between a rotating drive shaft of a prime mover and a rotating driven load shaft.

Early versions of the modern day torque converter were more simplistic fluid couplings. They were resistant to wear and effective at making gear selections in vehicle transmissions and making vehicle acceleration smooth. One inherent disadvantage of the early fluid couplings was the lack of their ability to transfer more than approximately 90% of the engine shaft rotation to the driven load shaft. Modern conventional torque converters must use an internal lockup clutch in order to gain over approximately 90% efficiency in the transfer of rotating power to the rotating driven load. However, the standard lockup style torque converter is often inadequate to handle a large amount of torque. Additionally, the lockup feature of the torque converter requires that the gear transmission employed with the torque converter have additional mechanical and electronic functionality, especially when trying to handle large amounts of torque. Another challenge with a torque converter is that one must be specifically designed for each engine/vehicle combination in order to obtain a desired "stall" speed. Stall speed is defined as the maximum rotating input shaft speed that the coupling will allow while the output shaft is not rotating and maximum input power is being applied to the input shaft. Another disadvantage of torque converters is the excessive amount of heat generated when the torque converter is functioning as a fluid coupling and the lockup clutch is not engaged. Typically, a torque converter is attached to a gear transmission housing in such a way that the hydraulic fluid employed in the gear transmission to shift the gear transmission is also employed in the torque converter. This results in eighty percent (80%) or more of the heat generated in an automatic transmission being generated by the torque converter. In automatic transmissions of this type, the gear transmission absorbs a substantial amount of the heat generated, thereby increasing wear and failures of the gear transmission, and decreasing the life of the transmission significantly.

In manual clutch applications, a common problem is the ability to employ a conventional mechanical clutch design that will handle large amounts of torque and still offer smoothness of drive-ability and any length of durability of the clutch. Clutches also generate excessive heat when slippage occurs and consequently sustain irreparable damages. The typical remedy employed to overcome the lack of ability of a mechanical clutch to hold large amounts of torque is to increase the diameter of the clutch pads or plates, which results in significantly increased rotating mass diameters and weight, or increase the number of clutch disks, which increases the costs and complexity of the clutch mechanism. These efforts to simply increase the clamping load of the clutch pressure plate result in an increased amount of effort by the vehicle driver to depress the clutch pedal. Other efforts to overcome the lack of ability of a mechanical clutch to hold large amounts of torque have resulted in increasing the coefficient of friction of the surfaces of opposing clutch disks which has resulted in decreasing the drive-ability and smoothness of the vehicle.

There is historically an ongoing battle of these factors in order to achieve optimum smoothness, drive-ability, durability, and torque capacity. In varying degrees, in the many other areas where a clutch or fluid coupling may be employed to transfer power from a rotating drive shaft to a driven shaft, the above discussed issues are also encountered.

The hydraulic shaft coupling apparatus of the invention overcomes the problems discussed above. The hydraulic shaft coupling apparatus provides an increased means of connecting a rotating power source drive shaft to a non-rotating driven shaft or to a gear transmission driven shaft, bringing the driven shaft or the transmission shaft up to the same speed as the power source drive shaft, providing the ability to mate the speeds of the two shafts controllably, adjustably, and smoothly, transferring large amounts of torque for extended periods of time, with a higher efficiency than conventional fluid couplings, with no change in performance over cycles of operation, providing additional capabilities such as an adjustable ability to provide a range of stall speeds when the apparatus is used in place of a torque converter, the ability to provide an adjustable torque limiting capability, and the novelty of having a sealed, self-contained fluid circuit that is not shared with a gear transmission.

SUMMARY OF THE INVENTION

The hydraulic shaft coupling apparatus of the invention is based on the concept of a gear pump that comprises two meshing external spur gears in a pump housing having a input port or suction port in the housing on one side of the meshing gears and an output port or pressure port in the housing on the opposite side of the meshing gears. A drive shaft enters the pump housing and is connected to a drive gear of the two gears, with the other gear being an idler gear. Rotation of the drive shaft causes rotation of both gears. As the gears rotate they separate on the input side or suction side of the pump, creating a void and suction which is filled by fluid drawn in through the input port. The fluid is carried between the teeth of the gears around the interior of the pump housing to the pressure side or output port of the housing where the gears mesh together and displace or pump the fluid through the output port.

In the hydraulic shaft coupling apparatus of the invention, the pump housing is connected to a power input drive shaft to be rotated by the drive shaft. What is typically the driven gear in the pump housing is connected to a power output driven shaft or transmission shaft. The apparatus thereby acts as a pump between the two shafts. However, rather than having a conventional inlet port and outlet port in the pump housing for fluid to flow through the pump, the pump housing of the apparatus has only an internal fluid passage that, together with the pump chamber of the pump housing, function as an internal fluid flow circuit isolated within the pump housing through which hydraulic fluid circulates.

A controllable fluid flow valve is positioned in the fluid passage. The valve is movable between first and second positions of the valve relative to the fluid passage. When the valve is moved to the second position relative to the fluid passage, the valve completely shuts off the ability of the hydraulic fluid to flow through fluid passage, thereby locking up the gears of the pump and causing the rotation of the pump housing caused by the rotating drive shaft to be transferred one-to-one to the driven shaft turning the driven shaft at the same speed or rate of rotation as the drive shaft. Further, when the valve is in its first position it does not restrict the flow of fluid through the fluid passage. When there is a difference in drive shaft speed and driven shaft speed, there is a substantial pumping action produced by the rotating gears in the pump housing resulting in the hydraulic fluid flowing freely through the fluid passage and the internal fluid flow circuit of the pump housing, causing very little resistance between the two shafts. However, when the rotation rate or speed of the pump housing increases, the valve gradually moves from its first position to its second position in response to the pump housing rotation rate. This causes the valve to gradually restrict the fluid flow through the fluid passage to where, eventually, the valve is in its second position, stopping the fluid flow. This in turn causes the pumping rotation of the gears in the pump housing to gradually slow as they try to compress the fluid being pumped through the fluid passage. The slowing of the gears in the pump housing results in more of the rotation speed of the pump housing being transferred to the driven shaft. The pumping action of the gears continues to be hydro-dynamically forced to slow and eventually stop as the gears try to compress the hydraulic fluid, thereby effectively bringing the driven shaft up to the same speed as the drive shaft rotating the pump housing.

In addition to the hydraulic locking of the pump of the apparatus, additional and further locking means may be employed by ways of various different types of locking means, such as internal clutches, locking pins or pistons that physically lock the idler gear to the housing thereby achieving a full one hundred percent (100%) efficiency of the transfer of rotation from the power input shaft to the transmission shaft.

The valve of the apparatus may be actuated by a simple mechanical plunging motion such as that provided by a conventional throw out bearing or by a flyweight that moves responsive to centrifugal forces, as well as other ways. Various other advantages can be realized through the employment of the apparatus, including an adjustable bypass fluid circuit, allowing the user to adjust the amount of torque that the hydraulic shaft coupling apparatus will transfer before the apparatus slips intentionally in order to protect components of the driveline employing the apparatus.

The use of a flyweight attached to the valve, where the flyweight is actuated by centrifugal force, can allow the user to quickly adjust the stall rotation speed of the apparatus when the apparatus is employed in place of a conventional torque converter. Furthermore, it should be apparent that the apparatus can be employed in any area that currently employs a variety of clutch designs, or fluid coupling designs.

BRIEF DESCRIPTION OF THE DRAWINGS

Further features of the hydraulic shaft coupling apparatus of the invention are set forth in the following detailed description of the invention and in the drawing figures.

DETAILED DESCRIPTION OF THE PREFERRED EMBODIMENT OF THE INVENTION

Figure 1:
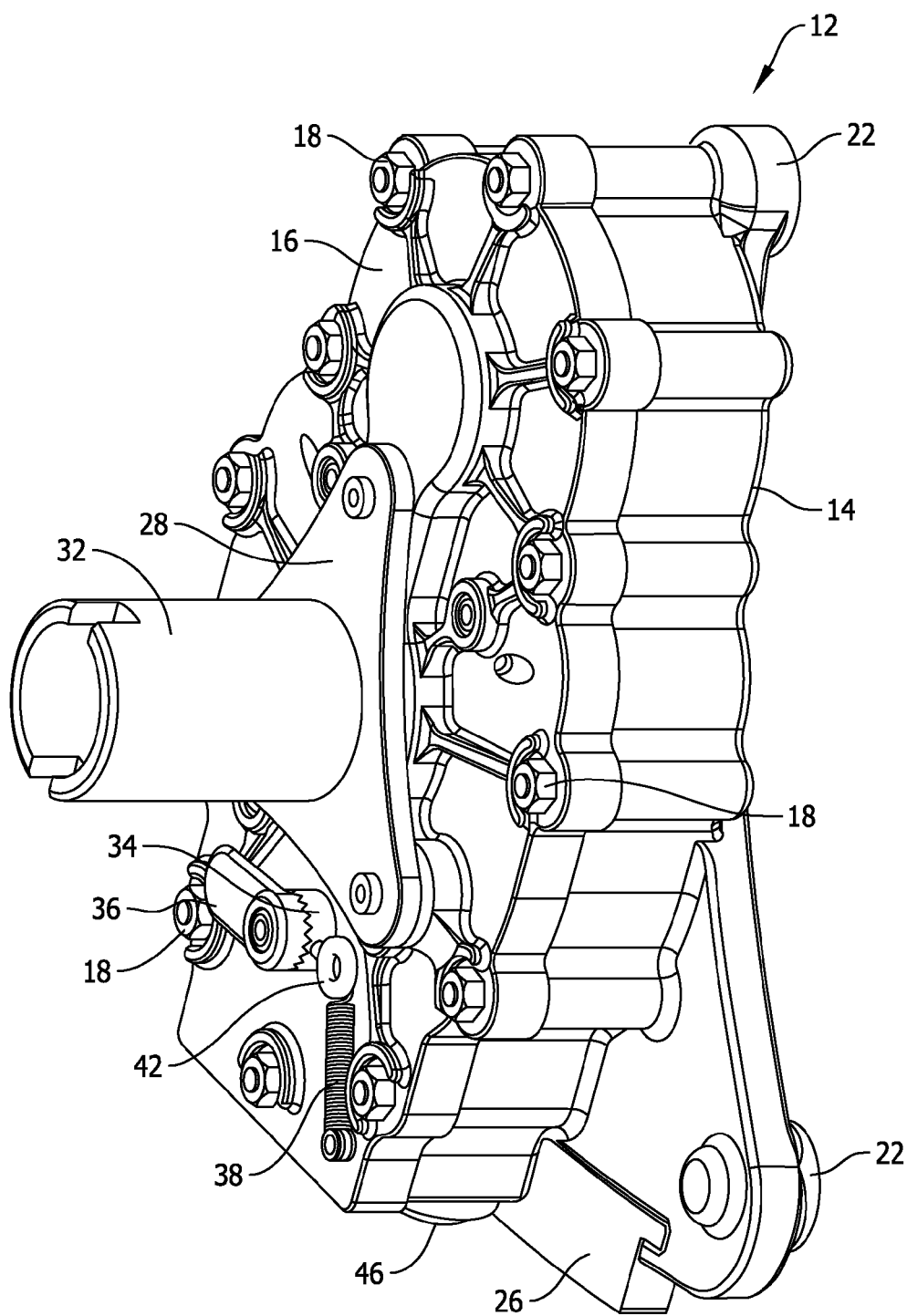
FIG. 1 is an isometric external view of the hydraulic shaft coupling apparatus.
Figure 2:
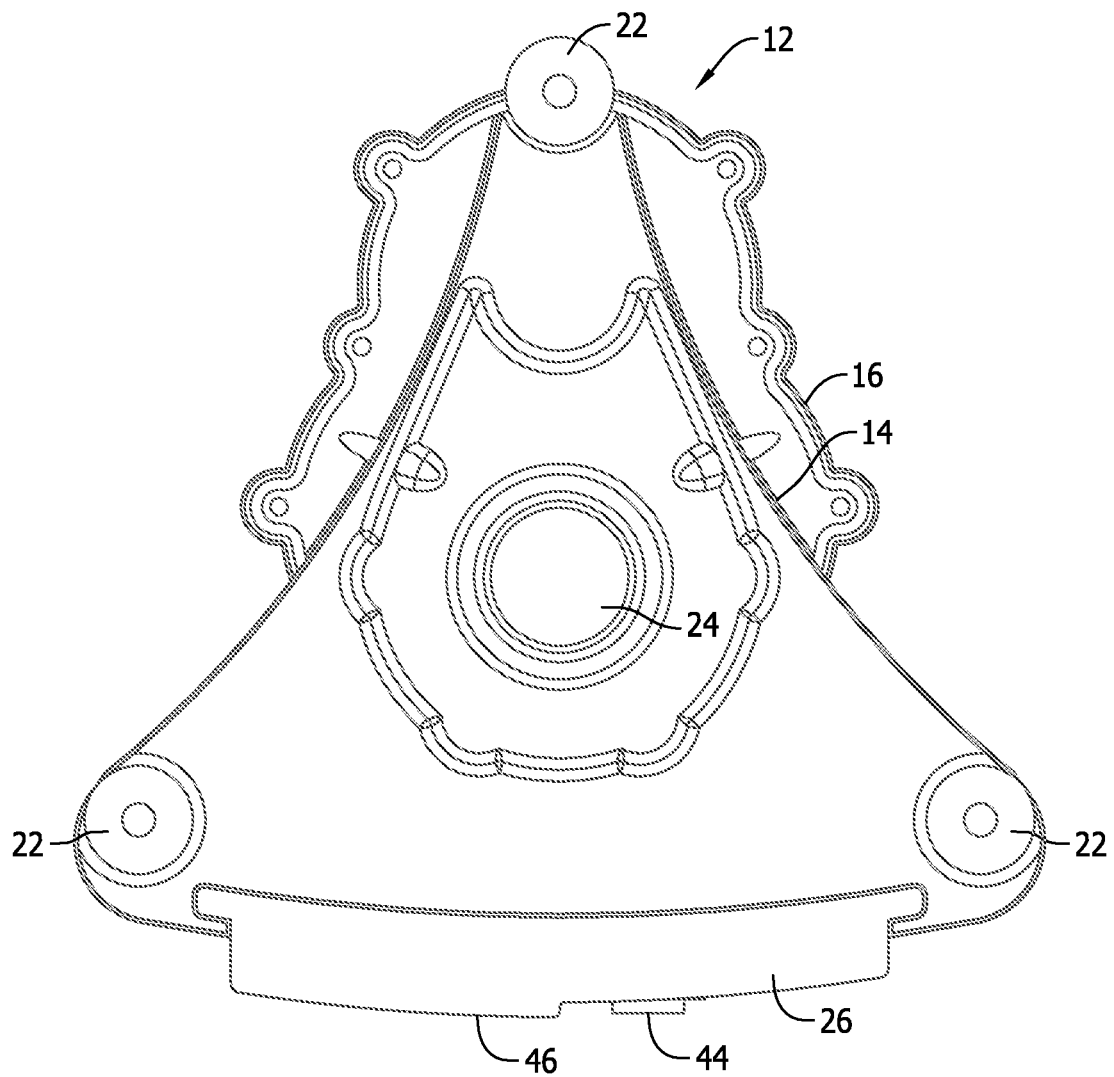
FIG. 2 is an elevation view of the front of the apparatus or the end of the apparatus that would be connected to an input power source drive shaft.

In the illustrated embodiment of the hydraulic shaft coupling apparatus of the invention to be described herein, the apparatus embodiment to be described would be used in place of a convention torque convertor, such as that employed in a conventional passenger car. The apparatus would therefore receive input rotational power from a drive shaft of the internal combustion engine of the car and would output rotational power to a driven shaft of the automatic transmission of the passenger car. It should be understood that this is only one environment in which the apparatus of the invention may be employed.

The external construction of the hydraulic shaft coupling apparatus 12 of the invention is first described with references to FIGS. 1-5 of the application. The apparatus 12 includes a pump housing that is comprised of a first or front housing member 14 and a second or rear housing member 16. The two housing members 14, 16 are secured to each other by a plurality of mechanical fasteners 18 such as bolts or externally threaded studs and internally threaded nuts. Other equivalent types of mechanical fasteners could be employed in securely holding together the first 14 and second 16 housing members. As seen in the drawing FIGS. 1-5, the fasteners 18 are spatially arranged around the two housing members 14, 16 to securely hold the housing members together and to prevent leakage of the hydraulic fluid from the interior volume of the pump housing.

The first or front housing member 14 is constructed with mounting pads 22 having fastener holes extending therethrough. In the embodiment of the apparatus shown in the drawing FIGS. 1-5, there are three mounting pads 22 spatially arranged around the apparatus. Other numbers of mounting pads may be employed. The mounting pads 22 are employed as a shaft coupling on the pump housing 14, 16 that can connect the apparatus 12 to the output drive shaft of a power source, such as the output drive shaft of an internal combustion engine. The shaft coupling provided by the mounting pads 22 enables rotation of the pump housing 14, 16 in response to rotation of the shaft coupling 22 by the engine drive shaft. In the embodiment of the apparatus 12 shown in the drawing FIGS. 1-5, the mounting pads 22 would be connected by mechanical fasteners to a flex plate or a flywheel rotated by the power output drive shaft of the engine. For example, externally threaded bolts would be inserted through the holes of the mounting pads 22 and into aligned internally threaded holes on the flex plate or flywheel of the drive shaft. In this manner, the pump housing comprised of the two housing members 14, 16 is connected to a power output drive shaft of an engine to rotate with the rotation of the drive shaft.

A piloting protrusion 24 projects from the front housing member 14 and is centered relative to the mounting pads 22. The piloting protrusion 24 is provided to be used in centering the pump housing members 14, 16 relative to the center rotational axis of the power output drive shaft of the engine with which the apparatus is used.

A counterweight 26 is attached by mechanical fasteners to one side of the first housing member 14. The counterweight is provided to balance the rotation of the complete apparatus 12 around the axis of rotation of the power output drive shaft.

A flange 28 is connected by mechanical fasteners to the second or rear housing member 16. A tubular collar 32 is secured to and projects from the flange 28. The collar 32 has a center axis that is coaxial with the piloting protrusion 24 and the drive shaft of the engine with which the apparatus 12 is used. The collar 32 is employed in attaching the apparatus 12 to the housing of an automatic transmission, typically the front pump housing of the automatic transmission with which the apparatus 12 is used. The interior bore of the collar 32 receives a driven shaft, for example a transmission input shaft for rotation of the transmission shaft in the collar.

A hydraulic fluid control valve 34, to be described in more detail later, extends through a hole in the second or rear pump housing member 16 and into the interior volume of the pump housing. A portion of the valve 34 extends from the hole in the second or rear housing member 16 and into the exterior environment of the apparatus 12.

Figure 3:
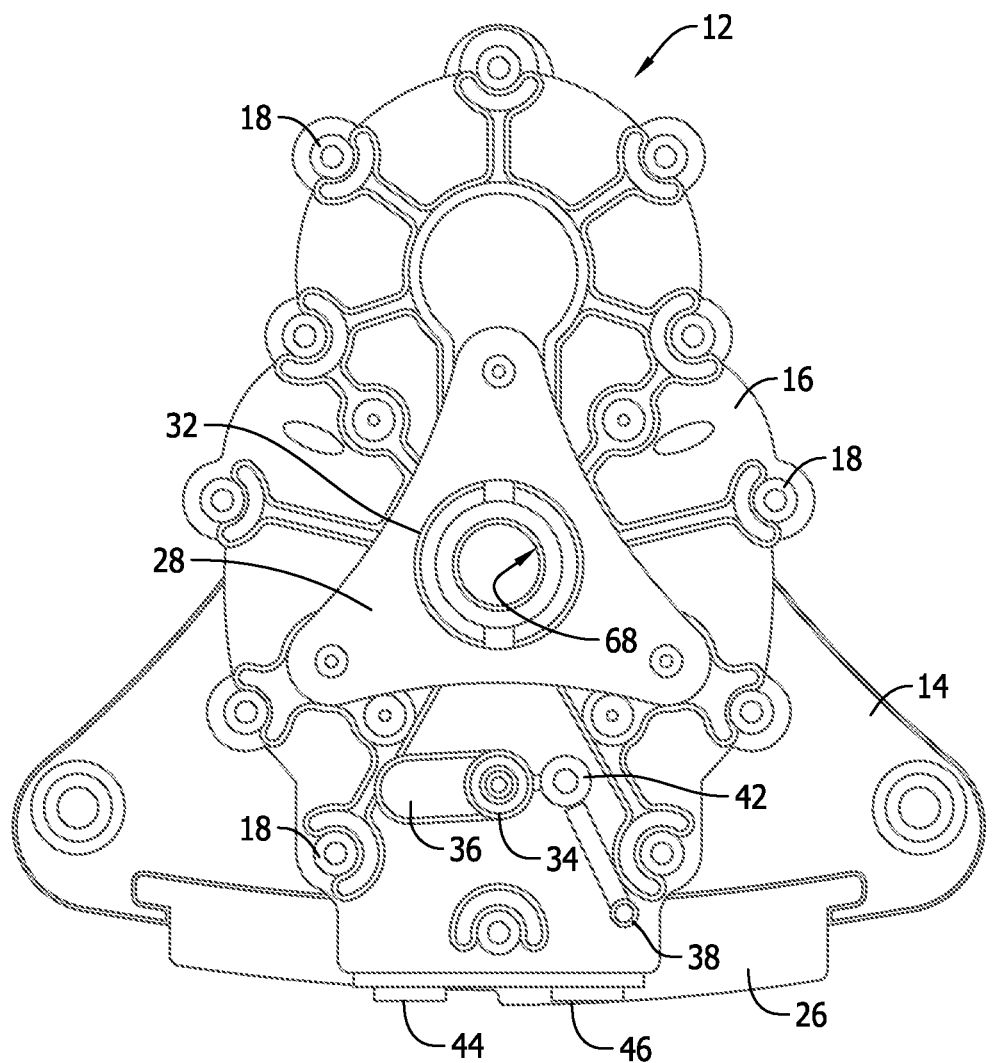
FIG. 3 is an elevation view of the rear of the apparatus or the end of the apparatus that would be connected to a power output driven shaft or a transmission shaft.
Figure 4:
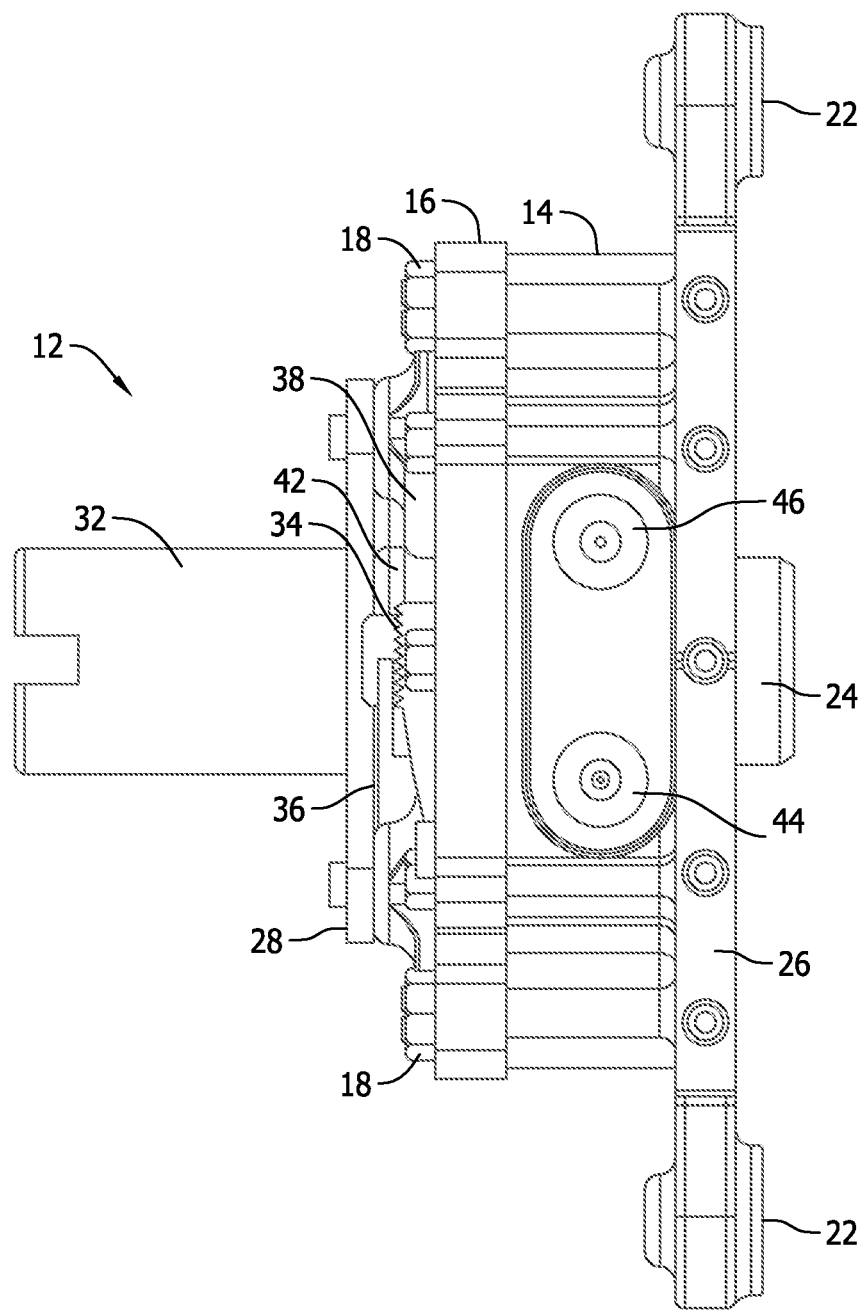
FIG. 4 is a view of the bottom of the apparatus as shown in FIGS. 1-3.
Figure 5:
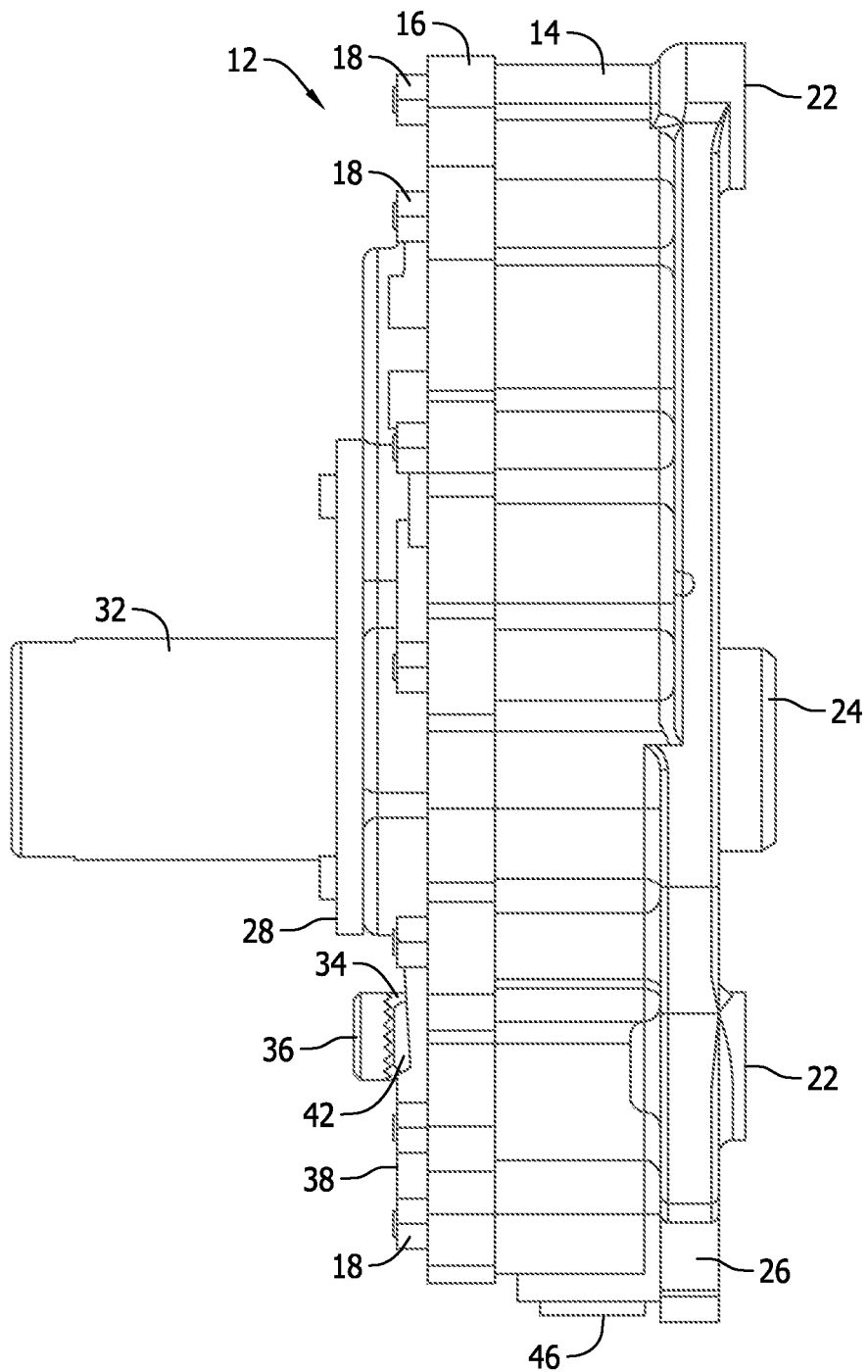
FIG. 5 is a view of a right side of the apparatus as shown in FIGS. 1, 3 and 4.

A flyweight 36 is attached to the portion of the valve 34 projecting from the pump housing. When the pump housing defined by the pump housing members 14, 16 is rotated by the power output drive shaft in use of the apparatus 12, the flyweight 36 is subjected to the centrifugal force of the rotating pump housing. As the centrifugal force created by the rotation of the pump housing increases, the centrifugal force exerted on the flyweight moves the flyweight 36 away from the axis of rotation or toward the bottom of the pump housing as shown in FIGS. 1 and 3. This movement of the flyweight 36 causes the valve 34 to rotate from a first position of the valve in the pump housing interior volume to a second position of the valve in the pump housing interior volume. The centrifugal force exerted on the flyweight 36 by rotation of the pump housing can be influenced or adjusted by changing the size, and or design, and or the position of the flyweight 36 on the valve 34.

A spring 38 is attached to the flyweight 36 to resist the movement of the flyweight. In the embodiment shown in FIGS. 1-5, the spring 38 is a coil spring that is attached to the flyweight 36 by an arm 42. The opposite end of the spring 38 is connected to the second or rear housing member 16 by a mechanical fastener. The spring 38 resists the movement of the flyweight 36 due to the centrifugal force produced by the rotation of the pump housing 14, 16. The spring 38 therefore urges or biases the valve 34 toward its first position in the pump housing interior volume during a low rate of rotation or a low rotation speed of the pump housing 14, 16. The spring 38 also controls how quickly the flyweight 36 moves in response to centrifugal force generated by the rotation of the pump housing 14, 16 and therefore controls how quickly the fluid control valve 34 moves from its first position toward its second position in the interior volume of the pump housing. The spring therefore also determines what rate of rotation or rotation speed of the pump housing 14, 16 is required to fully overcome the bias of the spring 38 to cause the valve 34 to move to its second position, or opened position which will be further explained. The movement of the valve 34 from it first position to its second position due to the centrifugal force exerted on the flyweight 36 from rotation of the pump housing 14, 16 can be adjusted depending on the size, and or stiffness, and or spring rate of the spring 38. The combination of the flyweight 36 and the spring 38 controlling the movement of the valve 34 allows for the accurate and precise control of the rotation of the valve 34 between its first and second positions it the interior of the pump housing 14, 16. This controls the stall speed and curve of the hydraulic locking action of the hydraulic shaft coupling apparatus 12 by way of the valve slowing and or stopping the flow of hydraulic fluid through the internal hydraulic fluid circuit in the pump housing 14, 16 which will be described in more detail later.

In variant embodiments of the apparatus of the invention, the valve 34 could be a plunger style valve or a gate valve and the design of the valve itself could function as the flyweight, eliminating the need for a separate flyweight.

A pair of externally screw threaded plugs 44, 46 are screw threaded into internally screw threaded holes in the side of the first or front housing member 14. The internally screw threaded holes communicate with the interior volume of the pump housing 14, 16. A first of the plugs 44 seals against the exterior of the first housing member 14 by way of a seal 48 on the plug. The first plug 44 covers a pressure relief assembly that is assembled into the same internally threaded hole that receives the first plug 44. The second plug 46 also seals against the exterior of the first housing member 14 by way of a seal 48. The second plug 46 closes a hydraulic fluid filling port of the pump housing 14, 16 provided by the internally threaded hole that receives the second plug 46.

Figure 6:
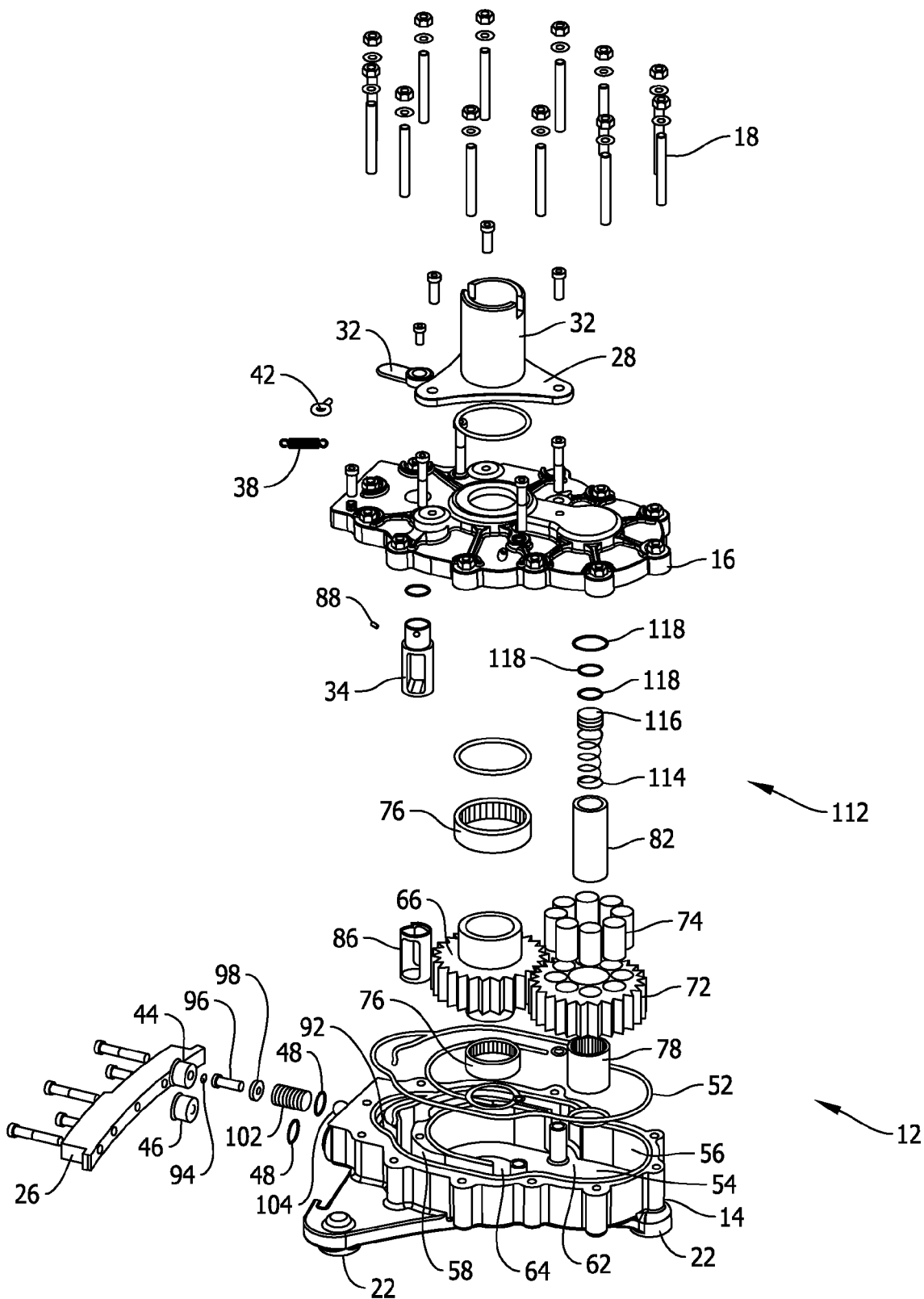
FIG. 6 is an exploded view of the component parts of the apparatus.

Referring to FIG. 6, specially designed seals 52 that correspond to the configurations of the mating surfaces of the first housing member 14 and the second housing member 16 are positioned between these two members and securely seal the interior volume of the pump housing 14, 16 from the exterior environment of the pump housing. The seals 52 prevent any leakage of hydraulic fluid from the pump housing interior volume. All of the seals in the preferred embodiment 12 are of a very high service temperature capability and wear resistant material such as poly-tetraflouroethylene, or fluorinated rubbers or thermoplastic rubbers.

Referring to FIGS. 6-9, the interior volume of the pump housing 14, 16 is comprised of a pump chamber 54 having a sidewall 56 that extends completely around the pump chamber, and a fluid passage 58 having a length that extends through the pump housing 14, 16 and around the pump chamber 54. The fluid passage 58 extends from an input opening 62 of the fluid passage in the pump chamber sidewall 56 that communicates with a pressure side of the pump chamber to an output opening 64 of the fluid passage in the pump chamber sidewall 56 that communicates with a suction side of the pump chamber. Together, the pump chamber 54 and the fluid passage 58 define a hydraulic fluid flow circuit that is sealed in and isolated in the pump housing 14, 16.

Referring to FIG. 6, a first external spur gear 66 is mounted in the pump chamber 54 for rotation relative to the pump chamber. The first gear rotates about the common axes of rotation of the power output drive shaft of the power source with which the apparatus 12 is employed and the driven shaft of the transmission with which the apparatus is employed. The first gear 66 has an internal bore with internal splines 68 that are coaxial with the drive shaft axis and the driven shaft axis. The internal splines 68 can be seen in FIG. 3 through the tubular collar 32 on the second housing member 16. The splines 68 enable the first gear 66 to be connectable to a shaft such as the driven shaft of a transmission. External splines on an end of the driven shaft would be inserted through the tubular collar 32 on the second housing member 16 and into the internal splines 68 of the first gear in connecting the driven shaft to the first gear. So connected, the driven shaft extends from the first gear 66 through the tubular collar 32 and from the pump housing 14, 16 to an exterior environment of the pump housing. The first gear 66 is basically the same type of driven gear employed in an external gear hydraulic pump. However, in the preferred embodiment the first gear 66 is constructed of a relatively hard metal composition. The size and profile of the spur teeth of the gear 66 can be altered to manipulate the functioning of the apparatus 12.

A second external spur gear or idler gear 72 meshes with the first gear 66. The second gear is also mounted in the pump chamber 54 for rotation of the second gear relative to the pump chamber. Like the first gear, the second gear 72 is of a type commonly used as a idler gear of an external gear hydraulic pump, and has the same material composition as the first gear 66. However, the weight of the second, idler gear 72 can be reduced by drilling holes in a spaced circumferential pattern around the gear and then filling the holes with a lightweight, high service temperature, and wear resistant polymer 74.

In the embodiment of the apparatus 12 shown in FIG. 6, the first gear 66 is supported axially in the pump chamber 54 by needle roller bearing assemblies 76 that are press fit into a pair of axially aligned cylindrical cavities formed in the interior surfaces of the first housing member 14 and the second housing member 16. The second, idler gear 72 has an interior center bore that is press fit with a needle roller bearing assembly 78. The second gear 72 is mounted for rotation in the pump chamber 54 in the correct meshed positional relationship with the first gear 66 by a cylindrical hardened pin 82 that is press fit into a pair of axially aligned cylindrical cavities formed in the interior surfaces of the first housing member 14 and the second housing member 16. The pin 82 is sealed in the cylindrical cavities formed in the first and second housing members 14, 16 by a pair of seals positioned at the opposite ends of the pin 82 and in the aligned cavities.

A pair of seals having dimensions to match the other diameter dimension of the first gear 66 interface with the coaxial cylindrical cavities formed in the interiors of the first housing member 14 and the second housing member 16. The seals are positioned at the bottoms of the aligned cavities to prevent hydraulic fluid from leaking from the pump chamber 54 through the splined interior bore 68 of the first gear 66, through the tubular collar 32 and into the housing of the transmission with which the apparatus 12 is employed.

With the first gear 66 mounted for rotation in the pump chamber 54 in axial alignment with the rotational axis of the drive shaft of the engine with which the apparatus 12 is employed and the driven shaft of the transmission with which the apparatus is employed, the first gear 66 is centered along the common rotational axes of the shafts to be coupled together by the apparatus. With the first gear 66 connected to the driven shaft of the transmission and the second gear 72 being mounted for rotation in the pump chamber 54, the pump housing comprised of the first 14 and second 16 pump housing members can be rotated around the first gear 66 by the rotation of the power source drive shaft. When the driven shaft and the first gear are stationary at start up, the rotation of the pump housing 14, 16 around the first gear 66 will cause rotation of the second gear 72 in the pump chamber 54 which causes the second gear to walk round the first gear 66. The rotation of the second gear 72 and the movement of the second gear around the first gear 66 causes relative rotation between the two gears that creates the pumping action of an external spur gear pump in the pump chamber 54. This pumping action allows hydraulic fluid contained in the pump chamber 54 and in the fluid passage 58 to be pumped freely within the internal fluid circuit of the pump housing 14, 16. The fluid is pumped by the relatively rotating gears 66, 72 from the pump chamber 54, through the fluid passage input opening 62, through the fluid passage 58, through the fluid passage output opening 64 and back to the pump chamber 54.

Figure 7:
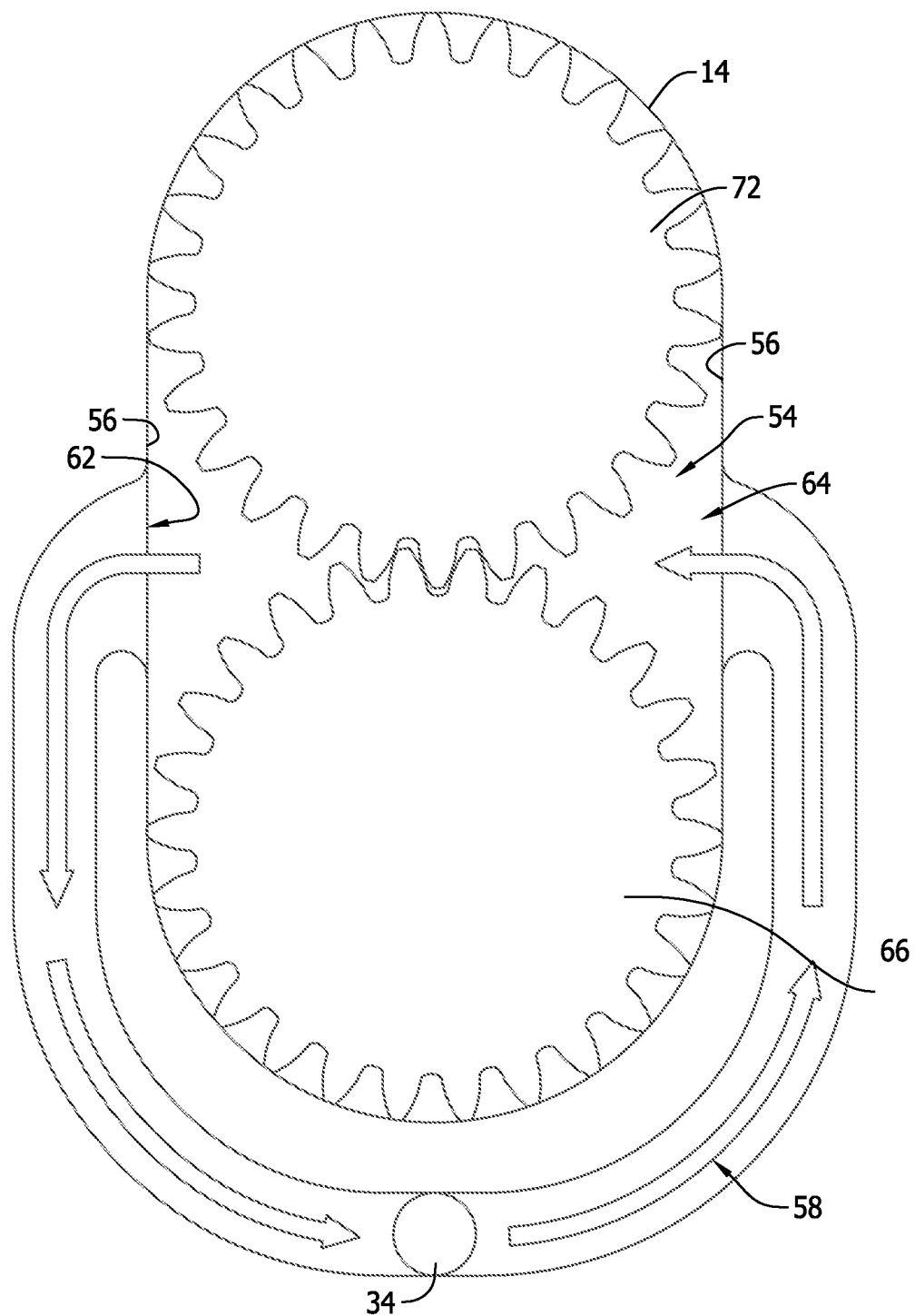
FIG. 7 is a schematic representation of the interior of the apparatus and the internal fluid flow path or fluid circuit of the apparatus.
Figure 8:
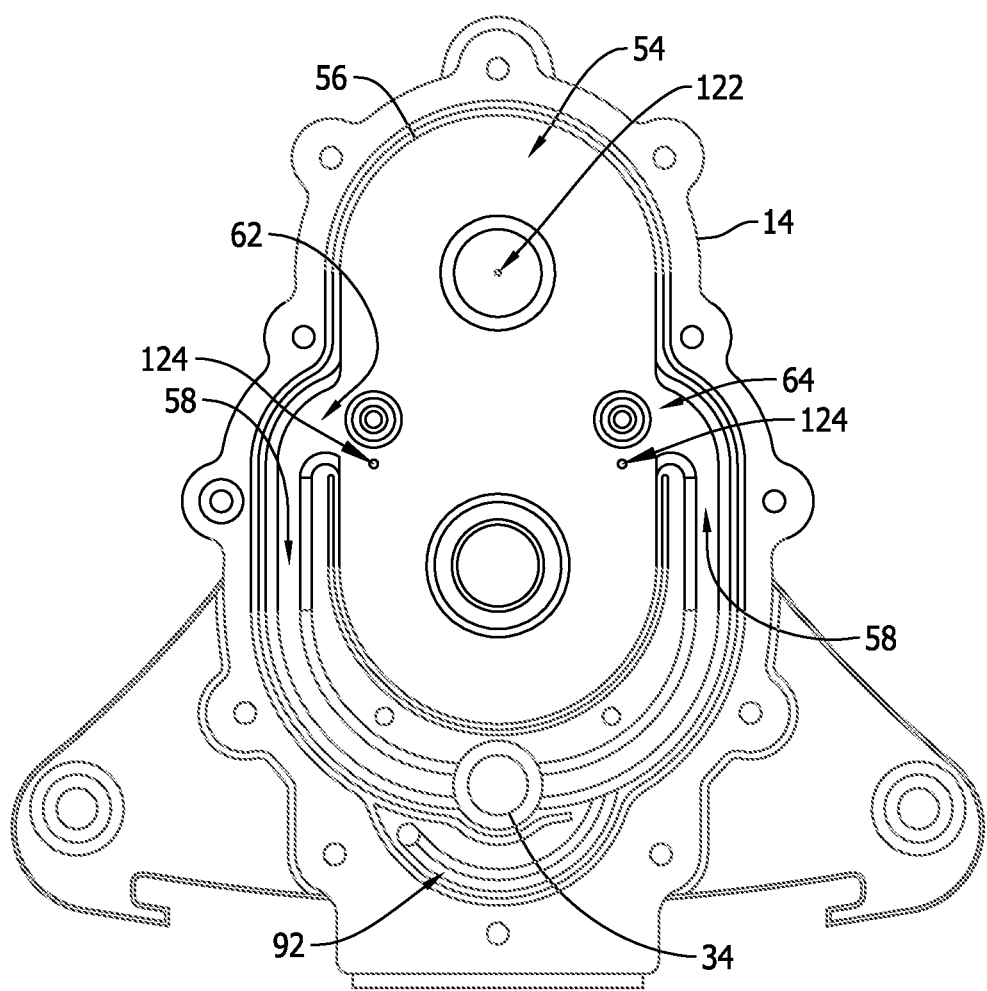
FIG. 8 is an elevation view of the interior or the opposite side of the first housing member at the front end of the apparatus shown in FIG. 2 with the component parts of the apparatus removed.
Figure 9:
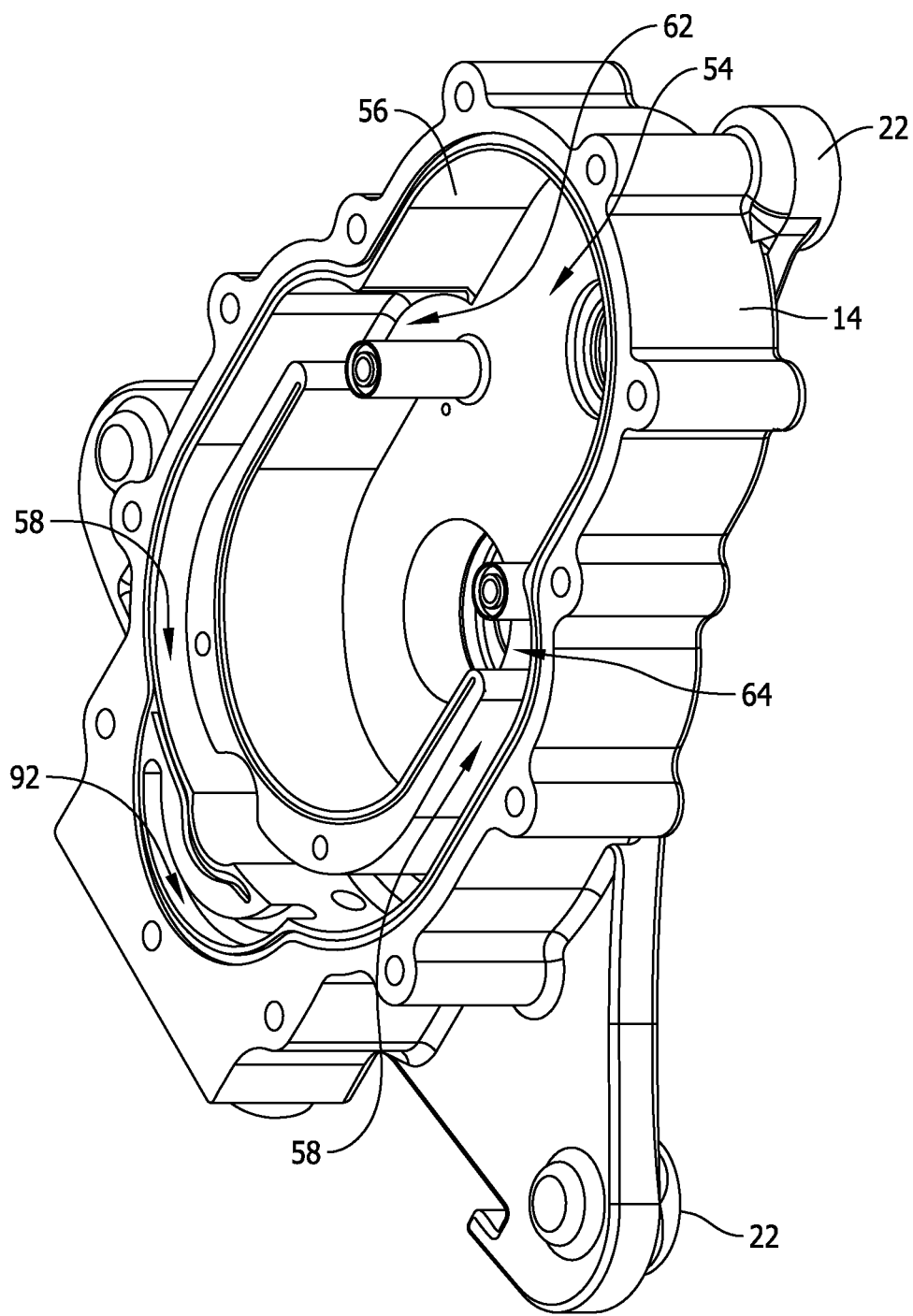
FIG. 9 is an isometric view of FIG. 8.
Figure 10:
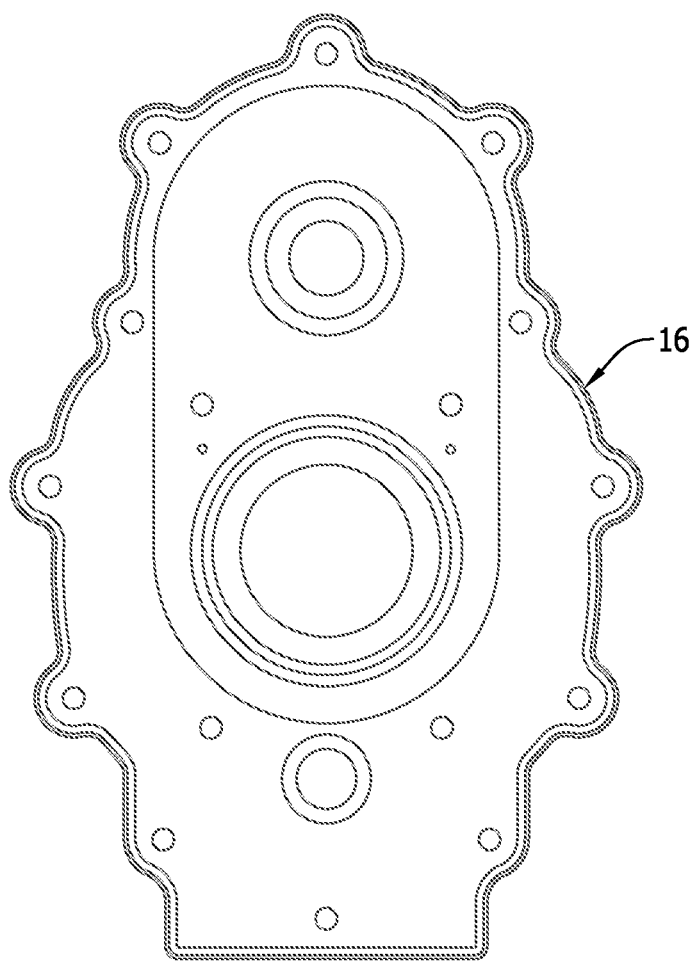
FIG. 10 is an elevation view of the interior or the opposite side of the second housing member at the rear end of the apparatus shown in FIG. 3 with the component parts of the apparatus removed.

FIG. 7 is a schematic representation of the hydraulic fluid flow path of the fluid circuit in the pump housing 14, 16 of the apparatus. Hydraulic fluid is pumped from the pump chamber 58 in a continuous isolated fluid circuit loop from the pressure side of the gears 66, 72, through the fluid passage input opening 62, through the fluid passage 58, through the control valve 34 positioned in the fluid passage, and continuing through the fluid passage 58 and through the output opening 64 to the suction side of the pump chamber 58 and the gears 66, 72.

Referring to FIG. 6, the control valve 34 is seated with a machine fit into a hard steel sleeve 86 that in turn is press-fit into the fluid passage 58 formed in the interior of the first or front housing member 14. The sleeve 86 has openings at its opposite sides which form a portion of the fluid passage 58. The openings in the opposite sides of the sleeve 86 give a precise hydraulic valving capability and provide solid support and anti-wear properties for the valve 34 that is mounted for rotation in the sleeve 86. A conventional o-ring seal is positioned on the valve 34 and seals between the valve and the interior surface of the second rear housing member 16. The seal on the valve 34 prevents hydraulic fluid from leaking from the fluid passage 54 through the hole in the second, rear housing member 16 provided for the valve 34. A hard pin 88 is press fit into the fluid control valve 34 and is positioned in a detent groove that is cut into the top of the valve sleeve 86. The positioning of the hard pin 88 in the detent groove limits the extent of the rotational movement of the valve 34 between its first and second positions relative to the fluid passage 58 in the valve sleeve 86.

An externally adjustable, torque limiting, internal fluid bypass circuit assembly 92 is provided in the first housing member 14. The assembly is positioned in the internally threaded hole in the first housing member 14 that receives the first plug 44. The bypass circuit assembly 92 is comprised of an o-ring seal 94 that is positioned in a stepped hole through the center of the first plug 44, an adjustment screw 96 the head of which is positioned in the plug hole against the o-ring seal 94, a hex nut 98, a compression spring 102, and a ball check valve 104. The bypass circuit assembly provides adjustable control of the hydraulic fluid flow through a bypass circuit 106 that circumvents or bypasses the fluid control valve 34 in order to provide an intentional mechanism that allows the apparatus 12 to only deliver an adjusted, limited amount of torque from the power source drive shaft to the transmission driven shaft. By turning the screw 96 in opposite directions and thereby adjusting the force exerted by the spring 102 on the ball check valve, the pressure of the hydraulic fluid in the interior of the pump housing 14, 16 that will unseat the ball check valve 104 and allow hydraulic fluid to pass through the bypass circuit is controllable and adjustable. The ball check valve 104 is seated against a small bore in the first housing member 14 that taps into the internal flow circuit prior to or upstream of the fluid control valve 34. The hail check valve 104 is held against the small bore by way of the spring 102. As the internal fluid circuit raises the hydraulic fluid pressure, the ball check valve 104 can be displaced by the pressure of the hydraulic fluid overcoming the pressure of the spring 102 that holds the ball check valve seated against the small bore. The bypass circuit assembly can be adjusted externally of the apparatus 12 by way of turning the screw 96 of the assembly counterclockwise, thereby moving the nut 98 of the assembly within the hexagonal shaped bore and consequently depressing the spring 102 causing the spring to exert a greater force against the ball check valve 104. As the spring 102 is compressed by the level of hydraulic fluid pressure in the fluid passage 58 required to overcome the spring 102 and displace the ball check valve 104 is adjustably raised. Ultimately, the higher the spring pressure of the internal bypass circuit assembly the more torque the apparatus 12 will transmit without intended slippage.

An accumulator assembly 112 comprised of a compression spring 114, a piston 116, and two seals 118 that are collectively assembled in the hardened pin 82. The assembly 112 allows room for expansion of the hydraulic fluid in the pump chamber 54 and the fluid passage 58 as the fluid expands in volume due to the absorption of heat created by the internal fluid flow and the gear set movement. A passage drilled in the second or rear housing member 16 between the needle rolling bearing assembly 76 of the first gear 66 and the cavity receiving the hardened pin 82. This passage allows the heated expanded hydraulic fluid to flow through the passage and into the accumulator, pressing down on the piston 116 and the spring 114 and filling the hollow center of the hardened pin 82. The opposite ends of the passage exposed on the exterior surface on the second or rear housing member 16 are sealed closed by plugs. The seals 118 of the accumulator assembly fit in grooves on the outer diameter of the piston 116 and provide for sealing sliding movement of the piston 116 through the interior of the hardened pin 82, sealing the hydraulic fluid from leaking to the exterior of the apparatus 12. An air vent 122 is provided in the first or front housing member 14 to allow air to be displaced to the exterior environment of the apparatus 12 from the interior of the hardened pin 82 as the piston 116 is moved in the interior of the pin.

Hydraulic fluid vent circuits 124 in the interior of the first pump housing member 14 provide a way to have hydraulic fluid vented from the inside of the first gear 66 seals, to the suction side of the gear set 66, 72 in the pump chamber 54. This ensures no highly pressurized hydraulic fluid is allowed to press against the inside of the first gear seals, and that no internal hydraulic fluid may be leaked out of the pump housing 14, 16. Check ball, spring, and plug assemblies (not shown) are inserted into the circuits in order to ensure a one-way flow of the internal hydraulic fluid from the inside of the first gear seals to the suction side of the gear set 66, 72 in the pump chamber 54, even if the rotation of the apparatus 12 is reversed, thereby switching the pressure and suction sides of the apparatus.

Additionally, for even higher efficiency applications, the hydraulic coupling apparatus 12 could contain sealing plates between the first and second housing members 14, 16 and the faces of the first 66 and second 72 gears, and between the first front housing member 14 and the outer tips of the spur teeth of the first gear 66 and second gear 72, such as that employed in external spur gear pumps in order to raise the efficiency at high pressures. A person skilled in the art would understand the common use and application of these sealing plates. The plates would also allow for the change of plates in the pump housing 14, 16 as wear to the plates occurs from the faces and teeth of the gears 66, 72 rather than the wearing of the surfaces of the first, front housing member 14.

Although the hydraulic shaft coupling apparatus of the invention has been described above by referring to one embodiment of the apparatus and one exemplary embodiment in which the apparatus may be used, it should be understood that modification and variations could be made to the apparatus without departing from the intended scope of the appended application claims.

What is claimed:

1. A hydraulic shaft coupling apparatus comprising:
   a pump housing containing a pump chamber and a fluid passage that extends inside the pump housing from one side of the pump chamber, around the pump chamber to a second side of the pump chamber;
   a shaft coupling connected to the pump housing for rotating the pump housing in response to rotation of the shaft coupling;
   a first gear mounted in the pump chamber for rotation of the first gear relative to the pump chamber, the first gear being connectable to a shaft with the shaft extending from the pump housing to an exterior environment of the pump housing;
   a second gear mounted in the pump chamber for rotation of the second gear relative to the pump chamber, the second gear meshing with the first gear whereby with the pump chamber and the fluid passage containing hydraulic fluid, rotation of the shaft coupling results in rotation of the first gear and the second gear and the rotation of the first gear and the second gear pumps the hydraulic fluid to flow from the one side of the pump chamber through the fluid passage to the second side of the pump chamber;
   a valve on the pump housing and in the fluid passage, the valve being movable between first and second positions of the valve relative to the fluid passage to adjust the flow of hydraulic fluid through the fluid passage, where the valve in the first position causes substantially no restriction to hydraulic fluid flow through the fluid passage and the valve in the second position substantially stops hydraulic fluid flow through the fluid passage, a portion of the valve projecting from the pump housing;
a flyweight attached directly to the portion of the valve projecting from the pump housing;
the valve being rotatable on the pump housing and in the fluid passage between the first and second positions of the valve; and,
the valve moving between the first and second positions of the valve relative to the fluid passage in response to a rotation rate of the pump housing creating a centrifugal force exerted on the flyweight with the valve moving toward the second position of the valve as the rotation rate of the pump housing increases and the valve moving toward the first position of the valve as the rotation rate of the pump housing decreases.

2. The apparatus of claim 1, further comprising:
the shaft coupling being connected directly to the pump housing for rotation of the pump housing with rotation of the shaft coupling.

3. The apparatus of claim 1, further comprising:
the pump chamber and the fluid passage in the pump housing define a fluid control circuit that is isolated in the pump housing.

4. The apparatus of claim 1, further comprising:
a biasing mechanism on the pump housing that exerts a biasing force on the valve, the biasing force urging the valve toward the first position of the valve relative to the fluid passage.

5. The apparatus of claim 4, further comprising:
the biasing force being adjustable.

6. The apparatus of claim 1, further comprising:
the valve adjusting a cross-sectional area of the fluid passage as the valve is moved between the first and second positions of the valve relative to the fluid passage.

7. The apparatus of claim 1, further comprising:
the valve adjusting a hydraulic pressure of the hydraulic fluid at the one side of the pump chamber as the valve is moved between the first and second positions of the valve relative to the fluid passage.

8. A hydraulic shaft coupling apparatus comprising:
a pump housing containing a pump chamber and a fluid passage that extends inside the pump housing from one side of the pump chamber around the pump chamber to a second side of the pump chamber;
a shaft coupling connected to the pump housing for rotating the pump housing in response to rotation of the shaft coupling;
a first gear mounted in the pump chamber for rotation of the first gear relative to the pump chamber, the first gear being connectable to a shaft with the shaft extending from the pump housing to an exterior environment of the pump housing;
a second gear mounted in the pump chamber for rotation of the second gear relative to the pump chamber, the second gear meshing with the first gear whereby with the pump chamber and the fluid passage containing hydraulic fluid, rotation of the shaft coupling results in rotation of the first gear and the second gear and the rotation of the first gear and the second gear pumps the hydraulic fluid to flow from the one side of the pump chamber, through the fluid passage to the second side of the pump chamber;
a valve on the pump housing and in the fluid passage, the valve being moveable between first and second positions of the valve relative to the fluid passage to adjust a fluid pressure of the hydraulic fluid at the one side of the pump chamber where the fluid pressure of the hydraulic fluid increases at the one side of the pump chamber in response to the valve moving toward the second position of the valve relative to the fluid passage and the hydraulic pressure of the hydraulic fluid at the one side of the pump chamber decreases in response to the valve moving toward the first position of the valve relative to the fluid passage, a portion of the valve projecting from the pump housing;
a flyweight attached directly to the portion of the valve projecting from the pump housing;
the valve being rotatable on the pump housing and within the fluid passage between the first and second positions of the valve relative to the fluid passage; and,
the valve moving between the first and second positions of the valve relative to the fluid passage in response to a rotation rate of the pump housing creating a centrifugal force exerted on the flyweight with the valve moving toward the second position of the valve relative to the fluid passage as the rotation rate of the pump housing increases and the valve moving toward the first position of the valve relative to the fluid passage in response to the rotation rate of the pump housing decreasing.

9. The apparatus of claim 8, further comprising:
the shaft coupling being connected directly to the pump housing for rotation of the pump housing with the rotation of the shaft coupling.

10. The apparatus of claim 8, further comprising:
the pump chamber and the fluid passage in the pump housing define a fluid flow circuit that is isolated in the pump housing.

11. The apparatus of claim 8, further comprising:
a biasing mechanism on the pump housing that exerts a biasing force on the valve that urges the valve toward the first position of the valve relative to the fluid passage.

12. The apparatus of claim 11, further comprising:
the biasing force being adjustable.

13. The apparatus of claim 8, further comprising:
the valve adjusting a cross sectional area of the fluid passage as the valve is moved between the first and second positions of the valve relative to the fluid passage.

14. A hydraulic shaft coupling comprising:
a pump housing having an interior volume that is sealed from an exterior environment of the pump housing, the pump housing interior volume including a pump chamber having a pressure side and an opposite suction side and a sidewall that extends around the pump chamber, the pump housing interior volume including a fluid passage having a length that extends through the pump housing and around the pump chamber from an input opening of the fluid passage in the pump chamber sidewall that communicates with the pump chamber on the pressure side of the pump chamber to an output opening of the fluid passage in the pump chamber sidewall that communicates with the pump chamber on the suction side of the pump chamber, the pump chamber and the fluid passage defining a fluid flow circuit that is isolated in the pump housing;
a shaft coupling connected stationary to the pump housing for rotating the pump housing in response to rotation of the shaft coupling;
a first gear mounted in the pump chamber for rotation of the first gear relative to the pump chamber, the first gear being connectable to a shaft with the shaft extending from the pump housing to an exterior environment of the pump housing;
a second gear mounted in the pump chamber for rotation of the second gear relative to the pump chamber, the second gear meshing with the first gear whereby with the pump chamber and the fluid passage containing hydraulic fluid, rotation of the shaft coupling results in rotation of the first gear and the second gear and the rotation of the first gear and the second gear pumps the hydraulic fluid to flow from the pressure side of the pump chamber through the fluid passage to the suction side of the pump chamber;

a valve on the pump housing and in the fluid passage, the valve being movable between first and second positions of the valve relative to the fluid passage to adjust a cross sectional area of the fluid passage at the valve and adjust the flow of hydraulic fluid through the fluid passage, whereby moving the valve toward the first position of the valve relative to the fluid passage increases the cross sectional area of the fluid passage at the valve and thereby reduces a hydraulic pressure of the hydraulic fluid at the pressure side of the pump chamber and moving the valve toward the second position of the valve relative to the fluid passage decreases the cross sectional area of the fluid passage at the valve and thereby increases hydraulic pressure in the hydraulic fluid at the pressure side of the pump chamber, a portion of the valve projecting from the pump housing;

a flyweight attached directly to the portion of the valve projecting from the pump housing;

the valve being rotatable on the pump housing and in the fluid passage between the first and second positions of the valve relative to the fluid passage; and, the valve being movable toward the second position of the valve in the fluid passage in response to an increase in a rate of rotation of the pump housing creating a centrifugal force exerted on the flyweight and the valve being moveable toward the first position of the valve relative to the fluid passage in response to a decrease in the rate of rotation of the pump housing and a decrease in the centrifugal force exerted on the flyweight.

* * * * *